US010800327B1

(12) United States Patent
Claywell et al.

(10) Patent No.: US 10,800,327 B1
(45) Date of Patent: Oct. 13, 2020

(54) ENHANCED ACCENT LIGHTING

(71) Applicant: GM GLOBAL TECHNOLOGY OPERATIONS LLC, Detroit, MI (US)

(72) Inventors: Mark R. Claywell, Birmingham, MI (US); Erwan R. Gautier, Plymouth, MI (US); Maqsood Rizwan Ali Khan, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/535,831

(22) Filed: Aug. 8, 2019

(51) Int. Cl.
*B60Q 3/80* (2017.01)
*G06T 7/90* (2017.01)
*G06T 7/11* (2017.01)

(52) U.S. Cl.
CPC ............... *B60Q 3/80* (2017.02); *G06T 7/11* (2017.01); *G06T 7/90* (2017.01); *G06T 2207/30196* (2013.01); *G06T 2207/30268* (2013.01)

(58) Field of Classification Search
CPC .... B60Q 3/80; G06T 7/11; G06T 7/90; G06T 2207/30196; G06T 2207/30268; H05B 47/00; H05B 47/105; H05B 47/125
See application file for complete search history.

(56) References Cited

U.S. PATENT DOCUMENTS

| | | | |
|---|---|---|---|
| 8,476,832 B2 * | 7/2013 | Prodin | B60Q 3/80 315/77 |
| 2010/0052536 A1 * | 3/2010 | Zielinski | H05B 47/18 315/77 |
| 2016/0152178 A1 * | 6/2016 | Peterson | B60Q 3/80 315/77 |
| 2017/0050561 A1 * | 2/2017 | Lickfelt | H05B 45/20 |
| 2018/0361954 A1 * | 12/2018 | Renke | E05F 15/695 |

* cited by examiner

*Primary Examiner* — Borna Alaeddini

(57) ABSTRACT

One general aspect includes a system for enhanced accent lighting within a vehicle interior, the system including: a memory configured to include one or more executable instructions and a processor configured to execute the executable instructions, where the executable instructions enable the processor to carry out the following steps: capturing an image of a user; and producing accent lighting in the vehicle interior based on the image.

20 Claims, 4 Drawing Sheets

ENHANCED ACCENT LIGHTING

INTRODUCTION

Accent lighting within vehicle cabins adds to the driving experience, especially at night. Not only does accent lighting assist passengers to see things within the cabin, it is colorful, attractive, aesthetically pleasing, and inviting as well as helps reinforce the brand image of the vehicle's make and model. That being said, after a while, passengers can get bored with the default accent lighting color scheme. It is therefore desirable to provide a system and method to enhance the customer experience by making this accent lighting customizable. It is also desirable to match this accent lighting with the clothing of the vehicle passengers, since passengers tend to wear colors that they find attractive and can identify with. Other desirable features and characteristics of the present invention will become apparent from the subsequent detailed description of the invention and the appended claims, taken in conjunction with the accompanying drawings and this background of the invention.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for enhanced accent lighting within a vehicle interior, the method including: capturing an image of a user; and producing accent lighting in the vehicle interior based on the image. Other embodiments of this aspect include corresponding computer systems, apparatus, and computer programs recorded on one or more computer storage devices, each configured to perform the actions of the methods.

Implementations may include one or more of the following features. The method further including: splitting the content of the image into a plurality of sections; and where each section of the plurality of sections is associated with a corresponding article of clothing of the user. The method where the accent lighting is divided into a plurality of zones within the vehicle interior, where each zone of the plurality of zones corresponds to one section of the plurality of sections, and where each zone of the plurality of zones produces an accent lighting color that corresponds to a dominant color of the article of clothing found in the corresponding section of the plurality of sections. The method where the dominant color of the article of clothing is based on a total area and/or contrast and/or brightest tone of one or more colors found in the section. The method where the image is captured via a camera located within the vehicle interior. The method further including: where the user is one of a plurality of users; and before the step of capturing the image, selecting the user from the plurality of users based on vehicle location, vehicle usage type, key fob location, user location, or some combination thereof. The method where: the content of the image includes a plurality of users; and the accent lighting in the vehicle interior is based on a common color found on one or more articles of clothing of the plurality of users. Implementations of the described techniques may include hardware, a method or process, or computer software on a computer-accessible medium.

One general aspect includes a system for enhanced accent lighting within a vehicle interior, the system including: a memory configured to include one or more executable instructions and a processor configured to execute the executable instructions, where the executable instructions enable the processor to carry out the following steps: capturing an image of a user; and producing accent lighting in the vehicle interior based on the image. Other embodiments of this aspect include corresponding computer systems, apparatus, and computer programs recorded on one or more computer storage devices, each configured to perform the actions of the methods.

Implementations may include one or more of the following features. The system where the executable instructions enable the processor to carry out the following additional steps: splitting the content of the image into a plurality of sections; and where each section of the plurality of sections is associated with a corresponding article of clothing of the user. The system where the accent lighting is divided into a plurality of zones within the vehicle interior, where each zone of the plurality of zones corresponds to one section of the plurality of sections, and where each zone of the plurality of zones produces an accent lighting color that corresponds to a dominant color of the article of clothing found in the corresponding section of the plurality of sections. The system where the dominant color of the article of clothing is based on a total area and/or contrast and/or brightest tone of one or more colors found in the section. The system, where the image is captured via a camera located within the vehicle interior. The system further including: the content of the image includes a plurality of users; and before the step of capturing the image, selecting the user from the plurality of users based on vehicle location, vehicle usage type, key fob location, user location, or some combination thereof. The system where: where the user is one of a plurality of users; and the accent lighting in the vehicle interior is based on a common color found on one or more articles of clothing of the plurality of users. Implementations of the described techniques may include hardware, a method or process, or computer software on a computer-accessible medium.

One general aspect includes a non-transitory and machine-readable medium having stored thereon executable instructions adapted to enhance accent lighting within a vehicle interior, which when provided to a processor and executed thereby, causes the processor to carry out the following steps: capturing an image of a user; and producing accent lighting in the vehicle interior based on the image. Other embodiments of this aspect include corresponding computer systems, apparatus, and computer programs recorded on one or more computer storage devices, each configured to perform the actions of the methods.

Implementations may include one or more of the following features. The non-transitory and machine-readable medium where the executable instructions enable the processor to carry out the following additional steps: splitting the content of the image into a plurality of sections; and where each section of the plurality of sections is associated with a corresponding article of clothing of the user. The non-transitory and machine-readable medium where the accent lighting is divided into a plurality of zones within the vehicle interior, where each zone of the plurality of zones corresponds to one section of the plurality of sections, and where each zone of the plurality of zones produces an accent lighting color that corresponds to a dominant color of the article of clothing found in the corresponding section of the plurality of sections. The non-transitory and machine-readable medium where the dominant color of the article of clothing is based on a total area and/or contrast and/or brightest tone of one or more colors found in the section. The non-transitory and machine-readable medium where the image is captured via a camera located within the vehicle interior. The non-transitory and machine-readable medium further including: where the user is one of a plurality of users; and before the step of capturing the image, selecting the user from the plurality of users based on vehicle location, vehicle usage type, key fob location, user location, or some combination thereof. Implementations of the described techniques may include hardware, a method or process, or computer software on a computer-accessible medium.

The above features and advantages and other features and advantages of the present teachings are readily apparent from the following detailed description for carrying out the teachings when taken in connection with the accompanying drawings.

BRIEF DESCRIPTION OF THE DRAWINGS

The disclosed examples will hereinafter be described in conjunction with the following drawing figures, wherein like numerals denote like elements, and wherein.

The exemplifications set out herein illustrate preferred embodiments of the present disclosure, and such exemplifications are not to be construed as limiting the scope of the disclosure in any manner.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
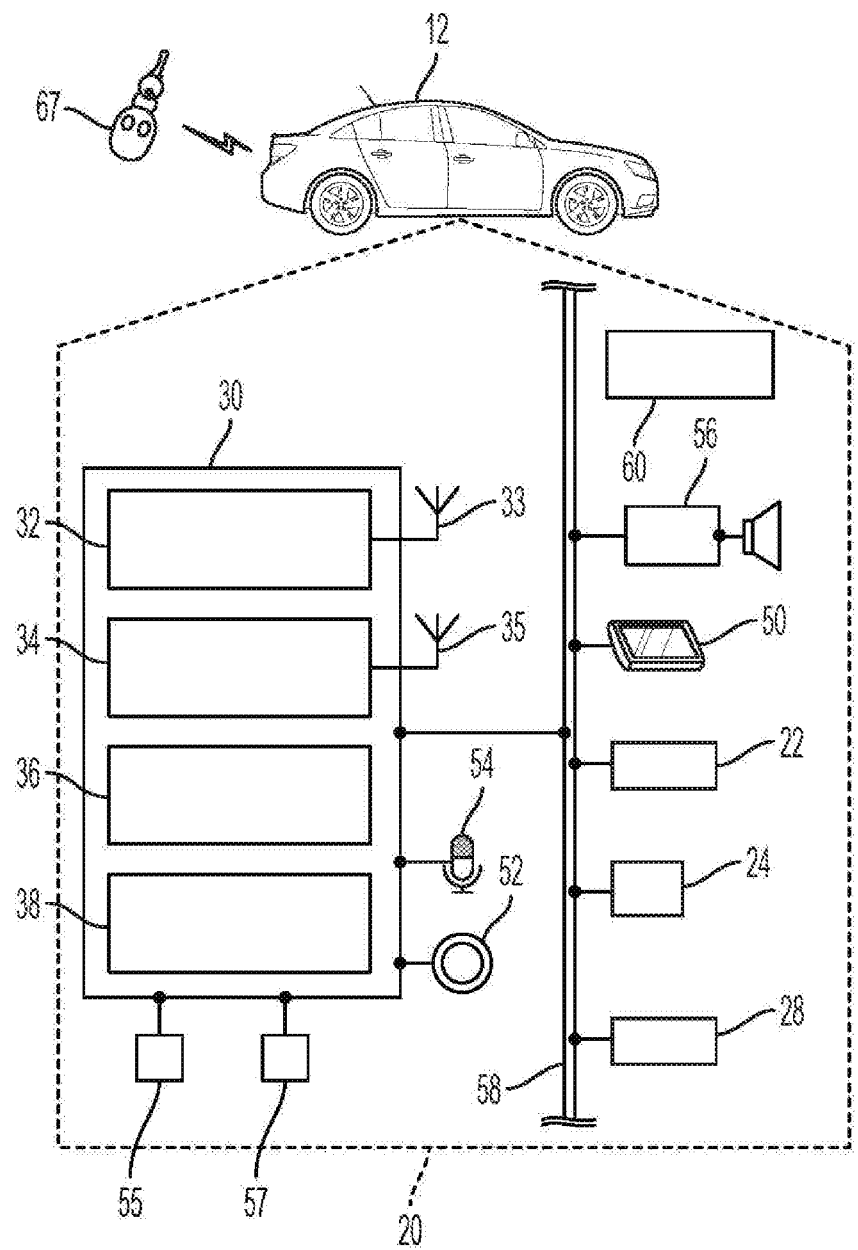
FIG. 1 shows a block diagram illustrating an exemplary apparatus for enhanced vehicle-interior accent lighting according to an exemplary embodiment of the present disclosure.

With reference to FIG. 1, there is shown a vehicle 12 that includes vehicle electronics 20 system. It should be understood that the disclosed method can be used with any number of different systems and is not specifically limited to the operating environment shown here. Thus, the following paragraphs simply provide a brief overview of one such electronics system 20; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft including unmanned aerial vehicles (UAVs), etc., can also be used. In certain embodiments, vehicle 12 may include a power train system with multiple generally known torque-generating devices including, for example, an engine. The engine may be an internal combustion engine that uses one or more cylinders to combust fuel, such as gasoline, in order to propel vehicle 12. The power train system may alternatively include numerous electric motors or traction motors that convert electrical energy into mechanical energy for propulsion of vehicle 12.

Some of the vehicle electronics 20 are shown generally, in FIG. 1 and includes a global navigation satellite system (GNSS) receiver 22, a body control module or unit (BCM) 24, and other vehicle system modules (VSMs) 28, a telematics unit 30, vehicle-user interfaces 50-56, and onboard computer 60. Some or all of the different vehicle electronics may be connected for communication with each other via one or more communication busses, such as communications bus 58. The communications bus 58 provides the vehicle electronics with network connections using one or more network protocols and can use a serial data communication architecture. Examples of suitable network connections include a controller area network (CAN), a media-oriented system transfer (MOST), a local interconnection network (LIN), a local area network (LAN), and other appropriate connections such as Ethernet or others that conform with known ISO, SAE, and IEEE standards and specifications, to name but a few. In other embodiments, a wireless communications network that uses short-range wireless communications (SRWC) to communicate with one or more VSMs of the vehicle can be used. In one embodiment, the vehicle 12 can use a combination of a hardwired communications bus 58 and SRWCs. The SRWCs can be carried out using the telematics unit 30, for example.

The vehicle 12 can include numerous vehicle system modules (VSMs) as part of vehicle electronics 20, such as the GNSS receiver 22, BCM 24, telematics unit 30 (vehicle communications system), vehicle-user interfaces 50-56, and onboard computer 60, as will be described in detail below. The vehicle 12 can also include other VSMs 28 in the form of electronic hardware components that are located throughout the vehicle and, which may receive input from one or more sensors and use the sensed input to perform diagnostic, monitoring, control, reporting, and/or other functions. Each of the VSMs 28 is hardwire connected by communications bus 58 to the other VSMs including the telematics unit 30. Moreover, each of the VSMs can include and/or be communicatively coupled to suitable hardware that enables intra-vehicle communications to be carried out over the communications bus 58; such hardware can include, for example, bus interface connectors and/or modems. One or more VSMs 28 may periodically or occasionally have their software or firmware updated and, in some embodiments, such vehicle updates may be over the air (OTA) updates that are received from a third-party computer (not shown) or a remote data center facility (not shown) via land network 76 and telematics unit 30. As is appreciated by those skilled in the art, the above-mentioned VSMs are only examples of some of the modules that may be used in vehicle 12, as numerous others are also possible. It should also be appreciated that these VSMs can otherwise be known as electronic control units, or ECUs.

Global navigation satellite system (GNSS) receiver 22 receives radio signals from a constellation of GNSS satellites (not shown). The GNSS receiver 22 can be configured for use with various GNSS implementations, including global positioning system (GPS) for the United States, BeiDou Navigation Satellite System (BDS) for China, Global Navigation Satellite System (GLONASS) for Russia, Galileo for the European Union, and various other navigation satellite systems. For example, the GNSS receiver 22 may be a GPS receiver, which may receive GPS signals from a constellation of GPS satellites (not shown). And, in another example, GNSS receiver 22 can be a BDS receiver that receives a plurality of GNSS (or BDS) signals from the constellation of GNSS (or BDS) satellites. The GNSS received can determine a current vehicle location based on reception of a plurality of GNSS signals from the GNSS satellites. The vehicle location information can then be communicated to the telematics unit 30, or other VSMs, such as the onboard computer 60. In one embodiment (as shown in FIG. 1), the wireless communications module and/or a telematics unit 30 can be integrated with the GNSS receiver 22 so that, for example, the GNSS receiver 22 and the telematics unit 30 (or the wireless communications device) are directly connected to one another as opposed to being connected via communications bus 58. In other embodiments, the GNSS receiver 22 is a separate, standalone module or there may be a GNSS receiver 22 integrated into the telematics unit 30 in addition to a separate, standalone GNSS receiver connected to telematics unit 30 via communications bus 58.

Body control module (BCM) 24 can be used to control various VSMs 28 of the vehicle, as well as obtain information concerning the VSMs, including their present state or status, as well as sensor information. The BCM 24 is shown in the exemplary embodiment of FIG. 1 as being electrically coupled to the communication bus 58. In some embodiments, the BCM 24 may be integrated with or part of a center stack module (CSM) and/or integrated with telematics unit 30 or the onboard computer 60. Or, the BCM may be a separate device that is connected to other VSMs via bus 58. The BCM 24 can include a processor and/or memory, which can be similar to processor 36 and memory 38 of telematics unit 30, as discussed below. The BCM 24 may communicate with telematics unit 30 and/or one or more vehicle system modules, such as an engine control module (ECM), audio system 56, or other VSMs 28; in some embodiments, the BCM 24 can communicate with these modules via the communications bus 58. Software stored in the memory and executable by the processor enables the BCM to direct one or more vehicle functions or operations including, for example, controlling central locking, power windows, power sun/moon roof, the vehicle's head lamps, the horn system, air conditioning operations, power mirrors, controlling the vehicle primary mover (e.g., engine, primary propulsion system), and/or controlling various other vehicle modules. In one embodiment, the BCM 24 can be used (at least in part) to detect a vehicle event, such as a power on state or a power off state or when the vehicle's air conditioning operations are turned ON or OFF (i.e., cooled air is being blown or is stopped being blown from the vents of the vehicle's Heating Ventilation and Air Conditioning (HVAC) system), based on one or more onboard vehicle sensor readings, as discussed more below.

Telematics unit 30 is capable of communicating data via SRWC through use of SRWC circuit 32 and/or via cellular network communications through use of a cellular chipset 34, as depicted in the illustrated embodiment. The telematics unit 30 can provide an interface between various VSMs of the vehicle 12 and one or more devices external to the vehicle 12, such as one or more networks or systems at a remote facility (not shown). This enables the vehicle to communicate data or information with remote systems, such as the remote data center.

In at least one embodiment, the telematics unit 30 can also function as a central vehicle computer that can be used to carry out various vehicle tasks. In such embodiments, the telematics unit 30 can be integrated with the onboard computer 60 such that the onboard computer 60 and the telematics unit 30 are a single module. Or, the telematics unit 30 can be a separate central computer for the vehicle 12 in addition to the onboard computer 60. Also, the wireless communications device can be incorporated with or a part of other VSMs, such as a center stack module (CSM), body control module (BCM) 24, an infotainment module, a head unit, a telematics unit, and/or a gateway module. In some embodiments, the telematics unit 30 is a standalone module, and can be implemented as an OEM-installed (embedded) or aftermarket device that is installed in the vehicle.

In the illustrated embodiment, telematics unit 30 includes, the SRWC circuit 32, the cellular chipset 34, a processor 36, memory 38, SRWC antenna 33, and antenna 35. The telematics unit 30 can be configured to communicate wirelessly according to one or more SRWC protocols such as any of the Wi-Fi™, WiMAX™, Wi-Fi™ Direct, other IEEE 802.11 protocols, ZigBee™, Bluetooth™, Bluetooth™ Low Energy (BLE), or near field communication (NFC). As used herein, Bluetooth™ refers to any of the Bluetooth™ technologies, such as Bluetooth Low Energy™ (BLE), Bluetooth™ 4.1, Bluetooth™ 4.2, Bluetooth™ 5.0, and other Bluetooth™ technologies that may be developed. As used herein, Wi-Fi™ or Wi-Fi™ technology refers to any of the Wi-Fi™ technologies, such as IEEE 802.11b/g/n/ac or any other IEEE 802.11 technology. And, in some embodiments, the telematics unit 30 can be configured to communicate using IEEE 802.11p such that the vehicle can carry out Vehicle-to-everything (V2X) communications such as, for example, vehicle-to-vehicle (V2V) communications, or vehicle-to-infrastructure (V2I) communications with infrastructure systems or devices, such as the remote facility. And, in other embodiments, other protocols can be used for V2X communications (e.g., C-V2X in 3GPP).

The SRWC circuitry 32 enables the telematics unit 30 to transmit and receive SRWC signals, such as BLE signals. The SRWC circuit can allow the telematics unit 30 to connect to another SRWC device such as, for example, a vehicle keyfob 67. Additionally, in some embodiments, the telematics unit 30 contains a cellular chipset 34 thereby allowing the device to communicate via one or more cellular protocols, such as those used by cellular carrier system 70, through antenna 35. In such a case, the telematics unit 30 is user equipment (UE) that can be used to in carry out cellular communications via cellular carrier system 70.

Antenna 35 is used for communications and is generally known to be located throughout vehicle 12 at one or more locations external to the telematics unit 30. Using antenna 35, telematics unit 30 may enable the vehicle 12 to be in communication with one or more local or remote networks via packet-switched data communication. This packet switched data communication may be carried out through use of a non-vehicle wireless access point or cellular system that is connected to a land network via a router or modem. When used for packet-switched data communication such as TCP/IP, the telematics unit 30 can be configured with a static Internet Protocol (IP) address or can be set up to automatically receive an assigned IP address from another device on the network such as a router or from a network address server.

Processor 36 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 36 executes various types of digitally-stored instructions, such as software or firmware programs stored in memory 38, which enable the telematics unit 30 to provide a wide variety of services. For instance, in one embodiment, the processor 36 can execute programs or process data to carry out at least a part of the method discussed herein. Memory 38 may include any suitable non-transitory, computer-readable medium; these include different types of RAM (random-access memory, including various types of dynamic RAM (DRAM) and static RAM (SRAM)), ROM (read-only memory), solid-state drives (SSDs) (including other solid-state storage such as solid state hybrid drives (SSHDs)), hard disk drives (HDDs), magnetic or optical disc drives, that stores some or all of the software needed to carry out the various external device functions discussed herein. In one embodiment, the telematics unit 30 also includes a modem for communicating information over the communications bus 58.

Vehicle electronics 20 also includes a number of vehicle-user interfaces that provide vehicle occupants with a means of providing and/or receiving information, including visual display 50, pushbutton(s) 52, microphone 54, ambient lighting system 55, audio system 56, and camera 57. As used herein, the term "vehicle-user interface" broadly includes any suitable form of electronic device, including both hardware and software components, which is located on the vehicle and enables a vehicle user to communicate with or through a component of the vehicle. The pushbutton(s) 52 allow manual user input into the telematics communications device 30 to provide other data, response, and/or control input. Ambient lighting system 55 includes numerous light emitting diodes (LEDs) strategically installed throughout the interior cabin of vehicle 12 to provide numerous accent lighting illumination zones (sometimes called theater lighting or convenience lighting) 70, for example, on the interior ceiling, exterior side of the glovebox door, along the dashboard and windshield frame, at the bottom edge of the dashboard 72 (to illuminate the floor for front passengers), underneath the rear end of the front seats (to illuminate the floor for rear seat passengers), along the seat headrests, at the interior door handles, and at the electric window switches. Audio system 56 provides audio output to a vehicle occupant and can be a dedicated, stand-alone system or part of the primary vehicle audio system. As such, audio system 56 receives analog information, rendering and delivering it as sound, via the entertainment bus. According to one embodiment, audio system 56 is operatively coupled to both vehicle bus 58 and an entertainment bus (not shown) and can provide amplitude modulated (AM) radio, frequency modulated (FM) radio, Real-time Streaming Protocol (RTSP) radio (IP streaming audio—such as, for example, Pandora Radio, Spotify, Amazon Music, etc.), satellite radio, CD, DVD, and other multimedia functionality. The audio component of audio system 56 may contain a speaker system or may utilize a speaker via arbitration on communications bus 58. This functionality can be provided in conjunction with or independent of an infotainment module. Camera 57 can be installed at numerous locations within the vehicle interior, for example, on the steering wheel column, dashboard, or beneath the rearview mirror. Camera 57 can also be oriented to capture images of one or more vehicle passengers and can be part of a semi-autonomous highway driving system incorporated into vehicle 12. In one or more alternative embodiments, camera 57 can be part of the front camera module (FCM) and can be installed on the vehicle's dashboard or backside of the rearview mirror. When camera 57 is part of the FCM, the image capturing device will be positioned to capture images of one or more vehicle passengers as they approach and enter into the vehicle 12.

Microphone 54 provides audio input to the telematics unit 30 to enable the driver or other occupant to provide voice commands and/or carry out hands-free calling via the wireless carrier system 70. For this purpose, it can be connected to an on-board automated voice processing unit utilizing human-machine interface (HMI) technology known in the art. Visual display or touch screen 50 is preferably a graphics display and can be used to provide a multitude of input and output functions. Display 50 can be a touch screen on the instrument panel, a heads-up display reflected off of the windshield, a video projector that projects images onto the windshield from the vehicle cabin ceiling, or some other display. Various other vehicle-user interfaces can also be utilized, as the interfaces of FIG. 1 are only an example of one particular implementation.

A vehicle key fob 67 generally performs conventional remote keyless entry (RKE) functions (which can be via telematics unit 30 in conjunction with BCM 42). Moreover, the term "key fob," as used herein, broadly includes not only separate transmitters attached to a key or set of keys by a loop or tether, but also portable remote transmitters regardless of whether they are attached to keys, as well as remote transmitters that are integrated together with a vehicle key as a single component. According to one embodiment, amongst other components, key fob 67 may include a protective housing, several user buttons, an RKE circuit, a power source, and an antenna. As is generally known of wireless key fobs 67, the user buttons enable a user to selectively activate different RKE functions at vehicle 12, including, but not limited to, locking and unlocking a door, arming and disarming a vehicle alarm system, activating a trunk release, panic signaling, remote ignition starting, and turning on interior and exterior lights. Of course, other buttons and RKE functions known in the art could also be used, including RKE functions that are performed automatically without the use of user buttons (one of which being mentioned below). Key fob 67 may automatically be paired/linked with telematics unit 30 via the SRWC protocol when within a wireless range. Skilled artisans will understand key fob 67 may alternatively gain RKE functions via wireless communications with one or more other known electronics components in vehicle 12 (e.g., a Passive Entry/Passive Start (PEPS) module, Wireless Communications Module (WCM), etc.).

Method

The method or parts thereof can be implemented in a computer program product (e.g., processor 36) embodied in a computer readable medium (e.g., memory 38) and including instructions usable by one or more processors of one or more computers of one or more systems to cause the system(s) to implement one or more of the method steps. The computer program product may include one or more software programs comprised of program instructions in source code, object code, executable code or other formats; one or more firmware programs; or hardware description language (HDL) files; and any program related data. The data may include data structures, look-up tables, or data in any other suitable format. The program instructions may include program modules, routines, programs, objects, components, and/or the like. The computer program can be executed on one computer or on multiple computers in communication with one another.

The program(s) can be embodied on computer readable media, which can be non-transitory and can include one or more storage devices, articles of manufacture, or the like. Exemplary computer readable media include computer system memory, e.g., telematics memory 38, e.g. RAM (random access memory), ROM (read only memory); semiconductor memory, e.g. EPROM (erasable, programmable ROM), EEPROM (electrically erasable, programmable ROM), flash memory; magnetic or optical disks or tapes; and/or the like. The computer readable medium may also include computer to computer connections, for example, when data is transferred or provided over a network or another communications connection (either wired, wireless, or a combination thereof). Any combination(s) of the above examples is also included within the scope of the computer-readable media. It is therefore to be understood that the method can be at least partially performed by any electronic articles and/or devices capable of carrying out instructions corresponding to one or more steps of the disclosed method.

Figure 2:
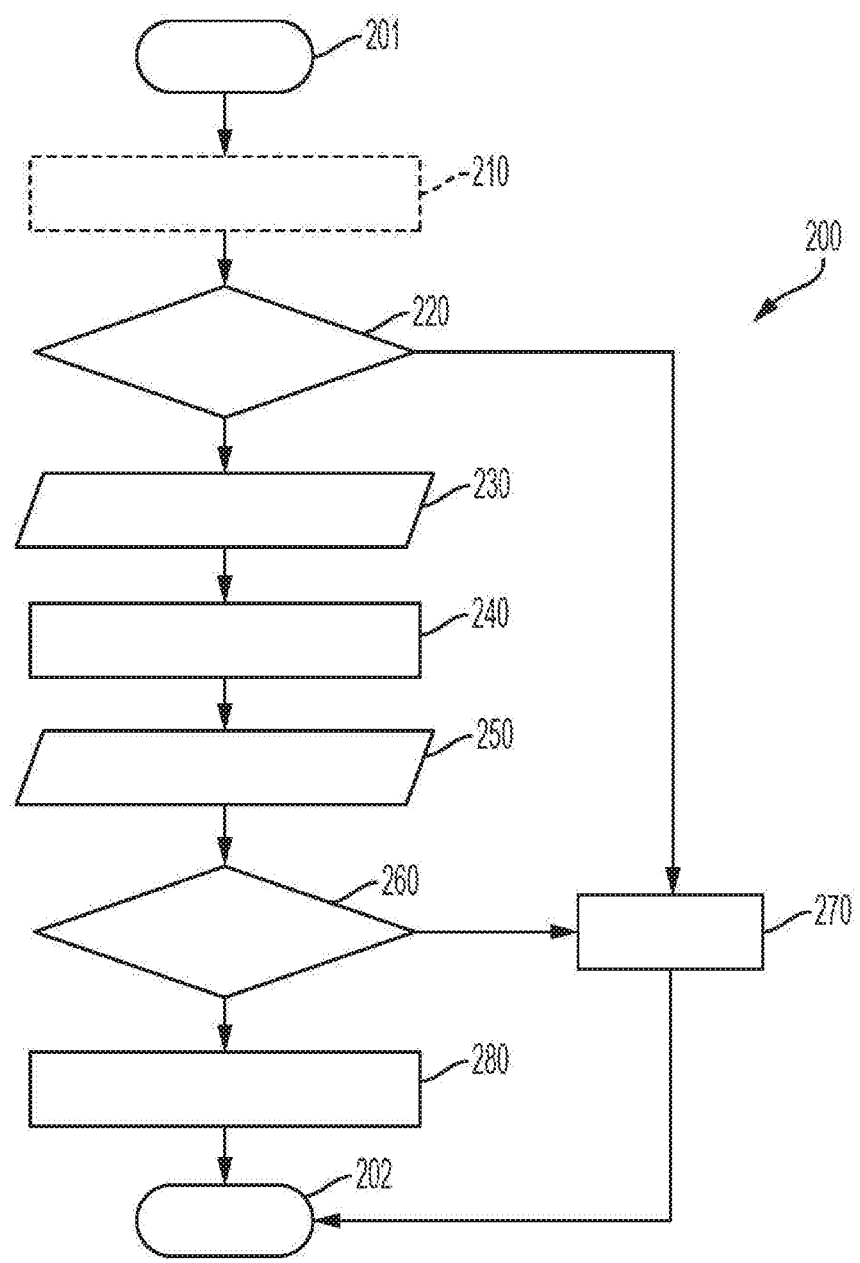
FIG. 2 is a flow chart for an exemplary methodology to enhance the accent lighting within a vehicle interior according to one aspect of the present disclosure.

Turning now to FIG. 2, there is shown an embodiment of a method 200 to generate enhanced accent lighting within a vehicle cabin. The method 200 begins at 201 with camera 57 capturing one or more images of one or more vehicle passengers (i.e., system users, including the vehicle operator). Depending on the embodiment of camera 57, for example, the image can be captured when the vehicle passenger(s) 62 have recently entered into the cabin of vehicle 12 (see FIG. 3) or are walking towards vehicle 12 (see FIG. 4). Moreover, when the method 200 begins, the captured image data is sent to processor 36 for review and analysis and the data can at least temporarily be stored in memory 38.

In optional step 210, processor 36 will implement a weighing technique to provide a weight value for each of the vehicle passengers 62 from the passenger group. These weight values can help processor 36 to make a selection of one of the vehicle passengers (e.g., the passenger with the largest weight value). This selection can be applied to various applications, for example, as mentioned below, as a basis for the enhanced accent lighting provided via method 200. In one or more embodiments, the weighing technique incorporates a look up table that includes precalculated and stored values that can be aggregated and applied to provide an overall weight value for two or more options. Moreover, this weighing technique can take in factors such as, but not limited to, the jurisdiction in which the vehicle is currently located (i.e., the vehicle location—which may be calculated from information provided by GNSS receiver 22), or vehicle use case type (e.g., ride-share applications, vehicle-share applications, privately-owned vehicle usage, taxi services, fleet vehicle usage, etc.), passenger location within the vehicle, or the location of the key fob 67 within the vehicle interior (as is generally known in the art, key fob 67 can be used to identify the roles of vehicle occupants within a vehicle). For example, using the lookup table, a higher output value may be provided to a vehicle located in a jurisdiction that allows colorful interior accent lighting than a vehicle located in a jurisdiction that restricts such lighting to a default setting. The lookup table can also contain differing values based on the use-case scenario (e.g., ride/vehicle-share applications are provided higher values than fleet vehicle applications). In another example, the lookup table may provide a higher value for the passenger holding key fob 67 than those other passengers that do not have it in their possession. In an additional example, the lookup table may provide a higher value for a passenger seated in the rear of the vehicle cabin than the other passengers seated in the vehicle. As follows, upon being provided the weight values for each of the vehicle passengers 62, the processor 36 can select the passenger with the largest value.

In step 220, via one or more virtual buttons provided by a graphical user interface (GUI) on visual display 50 or on the screen of a smart phone via a software app (e.g., MyCadillac App by GM™—not shown), one of the vehicle passengers 62 (e.g., the vehicle operator) selects whether they want the ambient lighting system 55 to provide customized interior accent lighting that corresponds to the clothing attire of at least one of the vehicle passengers 62. If the vehicle passenger 62 selects that they want this type of accent lighting configuration, then method 200 will move to step 230; otherwise, method 200 will move to step 270.

Figure 3:
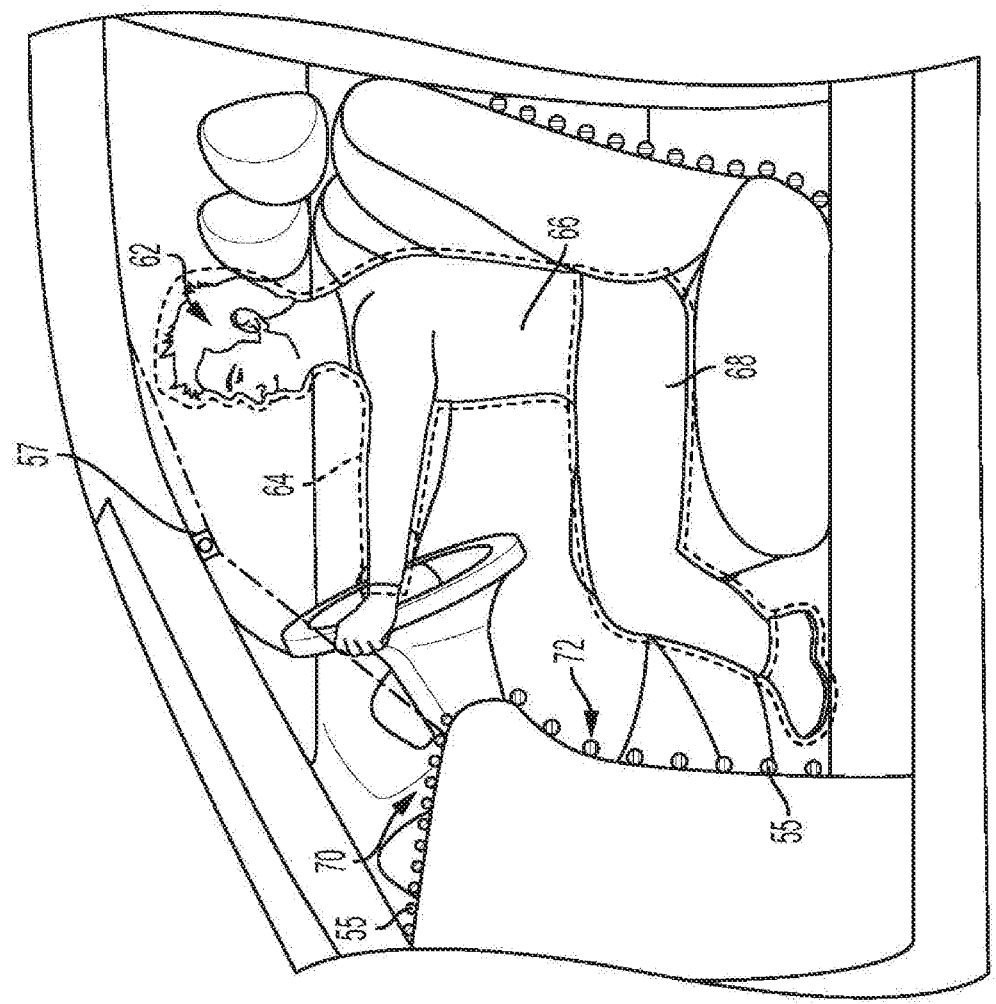
FIG. 3 depicts an application of an exemplary aspect of the process of FIG. 2 in accordance with one or more exemplary embodiments of the present disclosure.
Figure 4:
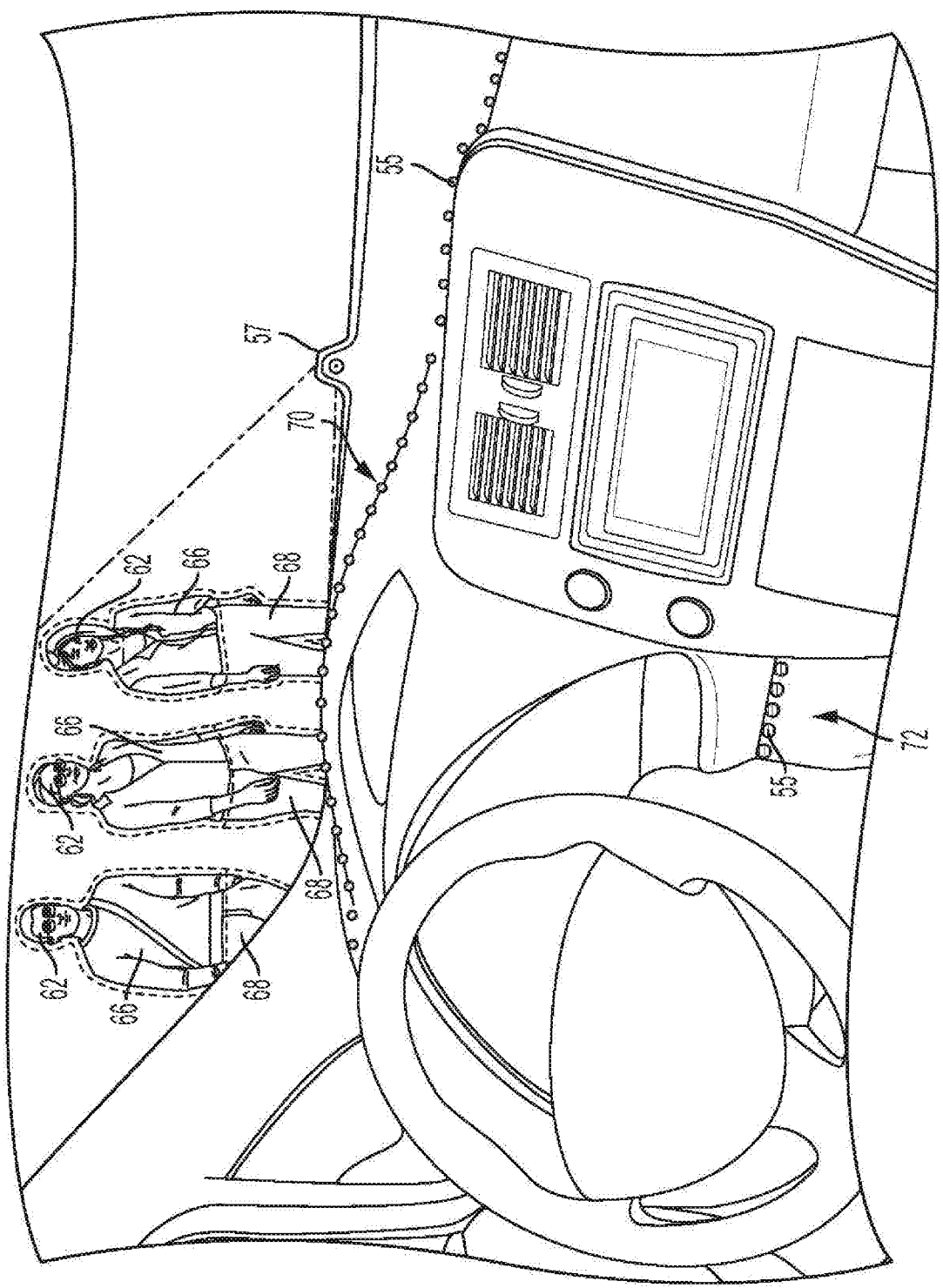
FIG. 4 depicts an application of another exemplary aspect of the process of FIG. 2 in accordance with one or more exemplary embodiments of the present disclosure.

In steps 230, as can be understood with reference to FIGS. 3 and 4, processor 36 will use a machine vision technique to outline 64 and thus define each of the vehicle passengers 62 within the content of the captured image data. Moreover, processor 36 will configure at least the content of the image data so as to determine the colors of the clothing attire for at least one of the vehicle passengers 62.

In step 240, in one or more embodiments, processor 36 will partition the content within each of the outlines of the vehicle passengers 62 into sections based on their clothing attire (i.e., making each passenger relevant within the image content). Alternatively, in one or more embodiments, when a weighing technique has been used, processor 36 will only partition the outline of the selected passenger 62 into sections based on his/her clothing (i.e., only making the selected passenger relevant within the image content). In one or more alternative embodiments, however, the processor 36 may simply use a known key fob location technique to select one passenger (i.e., the passenger carrying key fob 67) and partition that passenger's outline into sections based on his/her attire. Moreover, processor 36 may split the captured content within the outlines of the relevant vehicle passenger(s) into a number of sections that includes at least a torso section 66 and leg section 68—depending on what the passenger(s) is/are wearing. As follows, when the relevant passenger(s) is/are wearing separate pieces of clothing, the torso section 66 can be directed towards and associated with a piece of clothing such as a t-shirt, jacket, tank top, button-down shirt, etc. Conversely, the leg section 68 can be directed towards and associated with a piece of clothing such as pants, shorts, a skirt, etc. The processor may also determine the dimensions as well as the total area of each of the torso and leg sections 66, 68 (i.e., the dimensions and total areas of the article clothing of the selected passenger(s), which can be in terms of inches or feet). Nevertheless, when one or more outlined vehicle passengers are wearing one piece of clothing (e.g., a dress), the processor 36 will split the captured content of those one or more outlined passengers in such a way that the outline includes one single combined torso and leg section and the processor 36 will determine the dimensions and total area for that single section.

In step 250, in one or more embodiments, processor 36 will determine a dominant color/hue for each of the torso sections 66 and leg sections 68 (or combined torso and leg sections) of each relevant passenger within the image content. For example, when a torso section 66 and/or leg section 68 is associated with clothing attire having a single color (e.g., blue jeans or a solid colored t-shirt), processor 36 will chose the solid color (including shade, tone, and hue) as the dominant color for the corresponding section 66, 68. However, when the torso section 66 and/or leg section 68 is associated with clothing attire including some kind of pattern or design having multiple colors (e.g., strips, polka dots, houndstooth, tweed, etc.), processor 36 can determine the dominant color of the section based on total area of the colors found in the section and/or the brightest tones of colors found in the section and/or the contrast of the pattern or design in the section. Processor 36 can also access one or more lookup tables or color wheels (or both) in memory 38 to make this determination. In one instance, processor 36 would choose the color that stands out from the others in the section. For example, if the pattern in the section is stripes, processor 36 could choose the color of the widest stripes as the dominant color or processor 36 could choose the brightest tone found in the stripe pattern (regardless of whether these stripes are not the widest in the pattern). In another example, if the pattern is polka dots, processor 36 could choose the background color (e.g., red) and not the color of the dots (e.g., black/white) as the dominant color because the background color has the largest area and/or because it has the brightest tone found in the pattern. In another instance, processor 36 can develop a hue of the dominant color that is proportional to the colors found in the pattern/design. For example, when the pattern printed on the article of clothing is polka dots and 75% of the total area of the pattern is red (i.e., the background color) while only 25% of the total area of the pattern is black (i.e., the dots), processor 36 would develop a hue of red based on this proportionality (i.e., a darkened shade of red). Alternatively, when the pattern printed on the article of clothing is polka dots and 75% of the total area of the pattern is red (i.e., the background color) while only 25% of the total area of the pattern is white (i.e., the dots), processor 36 would develop a hue of pink based on this proportionality (i.e., a shade of white mixed with red). In yet another instance, when there is a stark contrast of color in the pattern found in the section (e.g., a green, brown, orange camouflage pattern), for example, processor 36 could access a lookup table specifically designed to determine a color that has been deemed a socially acceptable/popular representation of the pattern (e.g., to produce a dark shade of orange as its output). It should be understood that the exemplary techniques above are non-limiting and, for example, the processor may choose the dominant color based on techniques using a color wheel, contrasting colors, inverted colors, complimentary colors, or techniques that determine of a different hue, etc.

Moreover, in this step, when the image content includes more than one relevant passenger or when ambient lighting system 55 can only illuminate a finite number of vehicle interior zones, processor 36 can additionally determine a common color amongst the relevant torso sections 66 and leg sections 68 (or combined torso and leg sections). In one instance, processor 36 can choose the (dominant) color that is found in the majority of corresponding sections 66/68. For example, when two torso sections 66 in the image data content represents a yellow shirt and three other torso sections 66 in the content represents shirts that are green, processor 36 will chose the green color as the common color because it is found in a majority of the torso sections 66. In another instance, processor 36 can choose the (dominant) color that stands out in the image content as the common color. For example, if one torso section 66 represents a yellow shirt and four other torso sections 66 represent shirts that are navy blue, processor 36 can choose the yellow color as the common color because it stands out more than the navy-blue color. In another instance, processor 36 can develop a common color that is proportional to the colors found amongst the relevant torso sections 66 and leg sections 68. For example, if one torso section 66 represents a black shirt and three other torso sections 66 represent shirts that are red, processor 36 can generate a common color that is a hue of red based on this proportionality (i.e., a darkened shade of red). In yet another instance, when there is a stark contrast between the colors of the relevant torso sections 66 and leg sections 68, processor 36 could access a lookup table specifically designed to determine a color that has been deemed a socially acceptable/popular representation of the contrasting colors for the relevant sections 66, 68.

In step 260, upon producing a dominant color/hue for the selected passenger's articles of clothing and/or the common color amongst the articles of clothing of multiple relevant passengers, processor 36 will produce a GUI on visual display 50 (or on a user interface of a smartphone via a software app). This GUI will display the proposed accent lighting configuration based on the colors that have been produced. This GUI can also display an association of the dominant colors/common colors that have been produced to the accent lighting zones in the vehicle interior. For example, the GUI can display the common color produced for the relevant torso sections 66 as being associated with the accent lighting zone that illuminates the vehicle's dashboard 70 (see FIG. 3). The GUI can also display the common color for the leg section(s) 68 as being associated with the accent lighting zone that illuminates the bottom edge of the dashboard 72. Via one or more virtual buttons provided by the GUI, processor 36 can also request one of the vehicle passengers selects whether the proposed accent lighting configuration is acceptable. If the vehicle passenger accepts the accent lighting configuration, method 200 will move to step 280; otherwise, method 200 will move to step 270.

In step 270, processor 36 will cause ambient lighting system 55 to produce lighting in the vehicle interior based on one or more default settings. If this default lighting is not acceptable to the vehicle passenger(s), then they may adjust the colors of one or more accent lighting zones according to their personal desires (e.g., via a GUI on display 50).

In step 280, processor 36 will cause ambient lighting system 55 to produce the accent lighting configuration based on the dominant colors/common colors in at least two independent lighting zones of the vehicle interior. As follows, in this step, processor 36 causes ambient lighting system 55 to produce interior accent lighting with colors based on articles of clothing of one or more vehicle passengers, as they have been captured in one or more images via camera 57. After step 280, method 200 moves to completion. Skilled artists will see that the enhanced accent lighting configurations can be tailored to individual vehicle passengers throughout the vehicle interior. As follows, the dominant color of each article of clothing for each vehicle passenger may be produced in accent lighting zones corresponding to the location of each vehicle passenger. For example, accent lighting color corresponding to the dominant colors of the clothing of the vehicle operator may be produced along the dashboard (a first zone) and at the bottom edge of at least their side of the dashboard (a second zone); whereas, accent lighting corresponding to the dominant colors of the clothing of a backseat passenger may be produced underneath the rear end of the seat in front of the backseat passenger (a third zone) as well as around the interior door handle for the door next to the backseat passenger (a fourth zone).

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

None of the elements recited in the claims are intended to be a means-plus-function element within the meaning of 35 U.S.C. § 112(f) unless an element is expressly recited using the phrase "means for," or in the case of a method claim using the phrases "operation for" or "step for" in the claim.

What is claimed is:

1. A method for enhanced accent lighting within a vehicle interior, the method comprising:
    capturing an image of a plurality of users located within the vehicle interior;
    selecting a user from the plurality of users based on a weighing technique, wherein the weighing technique provides a weight value for each user from the plurality of users, wherein the weighing technique comprises a lookup table having a plurality of precalculated values stored therein, wherein the precalculated values correspond to one or more key fob locations within the vehicle interior and one or more user locations within the vehicle interior, and wherein the weight value for each user is based on an aggregation of two or more precalculated values from the lookup table; and
    producing accent lighting in the vehicle interior based on the user selected from the plurality of users.

2. The method of claim 1, further comprising:
    splitting the content of the image into a plurality of sections; and
    wherein each section of the plurality of sections is associated with a corresponding article of clothing of the user selected from the plurality of users.

3. The method of claim 2, wherein the accent lighting is divided into a plurality of zones within the vehicle interior, wherein each zone of the plurality of zones corresponds to one section of the plurality of sections, and wherein each zone of the plurality of zones produces an accent lighting color that corresponds to a dominant color of the article of clothing found in the corresponding section of the plurality of sections.

4. The method of claim 3, wherein the dominant color of the article of clothing is based on a contrast between a plurality of colors found in the section, wherein the dominant color is produced via a popularity lookup table configured to produce a color deemed a socially acceptable representation of the plurality of colors found in the section.

5. The method of claim 1, wherein the image is captured via a camera located within the vehicle interior.

6. The method of claim 1, wherein:
    the accent lighting in the vehicle interior is based on a dominant color found on one or more articles of clothing of the user selected from the plurality of users, wherein the dominant color is the brightest color tone found on the article of clothing, wherein the brightest color tone is determined via a color wheel or color tone lookup table.

7. The method of claim 1, wherein the precalculated values further correspond to a vehicle location and vehicle use case type, and wherein the vehicle use case type is one of a ride-share type, vehicle-share type, taxi service type, private usage type, or fleet vehicle type.

8. A system for enhanced accent lighting within a vehicle interior, the system comprising:
    a memory configured to comprise one or more executable instructions and a processor configured to execute the executable instructions, wherein the executable instructions enable the processor to:
    capture an image of a plurality of users located within the vehicle interior;
    select a user from the plurality of users based on a weighing technique, wherein the weighing technique provides a weight value for each user from the plurality of users, wherein the weighing technique comprises a lookup table having a plurality of precalculated values stored therein, wherein the precalculated values correspond to one or more key fob locations within the vehicle interior and one or more user locations within the vehicle interior, and wherein the weight value for each user is based on an aggregation of two or more precalculated values from the lookup table; and
    produce accent lighting in the vehicle interior based on the user selected from the plurality of users.

9. The system of claim 8, wherein the executable instructions further enable the processor to:
    split the content of the image into a plurality of sections; and wherein each section of the plurality of sections is associated with a corresponding article of clothing of the user selected from the plurality of users.

10. The system of claim 9, wherein the accent lighting is divided into a plurality of zones within the vehicle interior, wherein each zone of the plurality of zones corresponds to one section of the plurality of sections, and wherein each zone of the plurality of zones produces an accent lighting color that corresponds to a dominant color of the article of clothing found in the corresponding section of the plurality of sections.

11. The system of claim 10, wherein the dominant color of the article of clothing is based on a contrast between a plurality of colors found in the section, wherein the dominant color is produced via a popularity lookup table configured to produce a color deemed a socially acceptable representation of the plurality of colors found in the section.

12. The system, of claim 8, wherein the image is captured via a camera located within the vehicle interior.

13. The system of claim 8, wherein:
the accent lighting in the vehicle interior is based on a dominant color found on one or more articles of clothing of the user selected from the plurality of users, wherein the dominant color is the brightest color tone found on the article of clothing, wherein the brightest color tone is determined via a color wheel or color tone lookup table.

14. The system of claim 8, wherein the precalculated values further correspond to a vehicle location and vehicle use case type, and wherein the vehicle use case type is one of a ride-share type, vehicle-share type, taxi service type, private usage type, or fleet vehicle type.

15. A non-transitory and machine-readable medium having stored thereon executable instructions adapted to enhance accent lighting within a vehicle interior, which when provided to a processor and executed thereby, causes the processor to:
capture an image of a plurality of users located within the vehicle interior;
select a user from the plurality of users based on a weighing technique, wherein the weighing technique provides a weight value for each user from the plurality of users, wherein the weighing technique comprises a lookup table having a plurality of precalculated values stored therein, wherein the precalculated values correspond to one or more key fob locations within the vehicle interior and one or more user locations within the vehicle interior, and wherein the weight value for each user is based on an aggregation of two or more precalculated values from the lookup table; and
produce accent lighting in the vehicle interior based on the user selected from the plurality of users.

16. The non-transitory and machine-readable medium of claim 15, wherein the executable instructions enable the processor to:
split the content of the image into a plurality of sections; and
wherein each section of the plurality of sections is associated with a corresponding article of clothing of the user selected from the plurality of users.

17. The non-transitory and machine-readable medium of claim 16, wherein the accent lighting is divided into a plurality of zones within the vehicle interior, wherein each zone of the plurality of zones corresponds to one section of the plurality of sections, and wherein each zone of the plurality of zones produces an accent lighting color that corresponds to a dominant color of the article of clothing found in the corresponding section of the plurality of sections.

18. The non-transitory and machine-readable medium of claim 17, wherein the dominant color of the article of clothing is based on a contrast between a plurality of colors found in the section, wherein the dominant color is produced via a popularity lookup table configured to produce a color deemed a socially acceptable representation of the plurality of colors found in the section.

19. The non-transitory and machine-readable medium of claim 15, wherein the image is captured via a camera located within the vehicle interior.

20. The non-transitory and machine-readable medium of claim 15, further comprising:
the accent lighting in the vehicle interior is based on a dominant color found on one or more articles of clothing of the user selected from the plurality of users, wherein the dominant color is the brightest color tone found on the article of clothing, wherein the brightest color tone is determined via a color wheel or color tone lookup table.

* * * * *